UNITED STATES PATENT OFFICE.

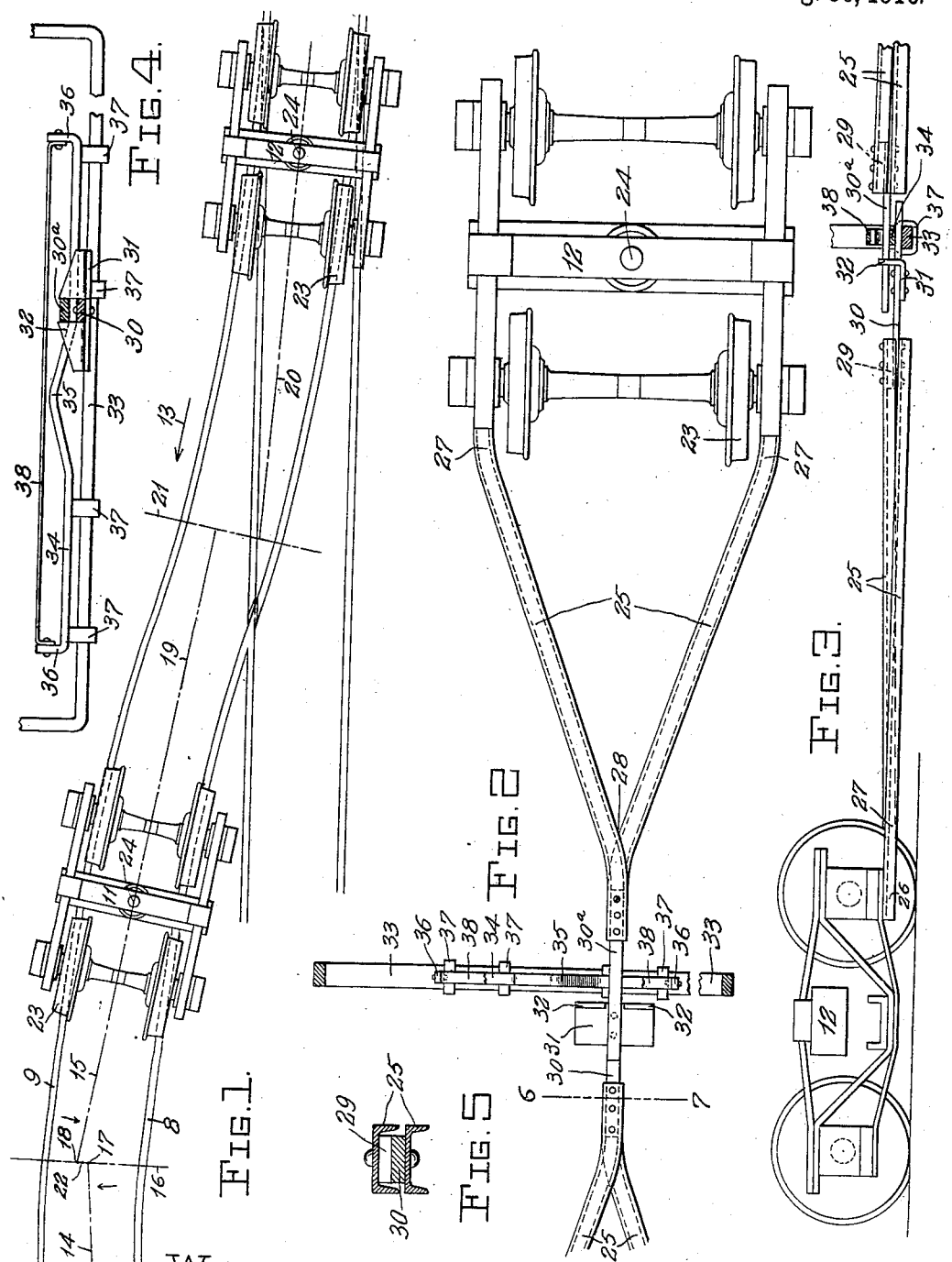

ARTHUR C. DENNIS, OF POCOMOKE CITY, MARYLAND.

ATTACHMENT FOR CAR-TRUCKS.

969,043.  Specification of Letters Patent.  Patented Aug. 30, 1910.

Application filed July 16, 1908. Serial No. 443,837.

*To all whom it may concern:*

Be it known that I, ARTHUR C. DENNIS, of Pocomoke City, in the State of Maryland, United States of America, have invented certain new and useful Improvements in Attachments for Car-Trucks, of which the following is a full, clear, and exact description.

This invention relates to improvements in railway car trucks and the main object is to provide a device that will maintain the car trucks in a tangential position when passing around curves, in order that the friction between the wheel flanges and the rails, with the tractive resistance incident thereto, may be reduced to a minimum.

A further object is to provide means whereby the trucks will turn independently when entering or when passing around a reverse curve.

The device consists essentially of a rigid connection or reach secured to one truck and releasably attached, midway between the trucks, to a similar rigid connection or reach secured to the opposite truck. The attaching means between the two rigid reaches is so arranged that the trucks are free to oscillate laterally with respect to each other. When entering a curve, the reach from the front truck moves outwardly and assumes a position tangential to the curve where it is intersected by the center line of the rear axle. The hind truck on reaching the curve, also tends to throw its reach outwardly tangential to the curve through the rear axle. The rear axle in the hind truck being farther from the car center, where the reaches meet, than the rear axle of the front truck, the reach of the hind truck tends to move farther outwardly than the reach of the front truck. The reaches, when moved outwardly automatically, engage each other, one acting on the other in such a manner as to hold both trucks approximately tangential to the curve. The turning tendency of the trucks is produced by the longitudinal skidding on the curves due to the inequality of length of wheel travel, and is balanced in each truck by the equal turning tendency in the other truck acting through the reaches. The trucks are thus maintained in an approximately tangential position with respect to the curve, and the flanges are relieved from the pressure due to the turning tendency as well as the pressure due to the lateral wheel skidding. When the trucks are on a reverse curve, such as that met with at almost every switch, the front and hind trucks will turn in opposite direction. It is obvious that any attempt to limit this turning movement would result in throwing the trucks across the track to such an extent that the trucks might become derailed. When the trucks are passing over a reverse curve, the reaches automatically disconnect and the trucks are left free to oscillate independently.

In the drawings which illustrate my invention:—Figure 1 is a diagram showing the relation between the wheels of a pair of car trucks and the rails in passing over a reverse and a plain curve. Fig. 2 is a plan view of the mechanism used in neutralizing the swinging or turning of the car trucks. Fig. 3 is a side elevation of the device shown in Fig. 2. Fig. 4 is an elevation of the attaching mechanism between the reaches. Fig. 5 is a cross sectional view on the line 6—7 of Fig. 2.

In the above defined figures, 8 and 9 designate the rails of a curved track; and 10, 11 and 12 trucks traveling thereon in the direction of the arrow 13. In the diagram Fig. 1, I have shown the trucks 11 and 12 in full lines on a reverse curve and a portion of the truck 10 in dotted lines on a plain curve. Hereafter when describing the device on a reverse curve, the truck 11 will be considered the front truck and the truck 12 the back truck. When describing the device on a plain curve, the truck 10 is the front truck and the truck 11 the back truck. I have shown the center lines 14 and 15 of the front and back trucks 10 and 11, respectively, produced until they intersect the line 16 drawn midway between the trucks at 17 and 18. The center lines 19 and 20 of the front and back trucks 11 and 12 are also produced until they intersect the line 21 drawn midway between the trucks. When the trucks are traveling on a plain curve, the center lines 14 and 15 should theoretically intersect the line 16 at the same point 22. They do not do so, however, owing to the inequality of length of wheel travel. The truck is turned in an oblique position by the stress due to the wheels on the inner rail of the curve tending to run ahead on their shorter path. This turning of the trucks is checked by the reaction of the flanges of the wheels 23 against the rails. The stress necessary to skid the front wheels of the truck laterally, due to the oblique position of the truck, produces an additional stress and reaction between the flanges of the wheels 23 and the rail. It will be obvious that this will result in the rapid wearing of rails and flanges and will materially increase the tractive resistance. It will also be obvious that if the truck 10 be swung in the direction of the arrow and the truck 11 swung to meet it, that both trucks will be swung from an oblique position with respect to the rails and rendered approximately tangential thereto, thus reducing the stress on the flanges and the friction incident thereto.

When the trucks 11 and 12 are traveling on a reverse curve as depicted in Fig. 1, any force which would tend to turn the trucks toward each other, as above described, would result in increasing the stress on the flanges of the wheels 23 of the front truck 11, as the flange of the wheel 23 would then be forced still more against the rail.

From the foregoing, it will be obvious that any mechanism which is devised to turn the trucks when they are traveling on a plain curve must be such that the trucks will move independently when traveling on a reverse curve.

In Figs. 2, 3, 4 and 5, I have shown a device for accomplishing the above purpose, said device consisting essentially of a pair of connecting arms or reaches 25 secured to each side of the truck frame, as shown at 26. The portions 26 of the reaches, which are fixed to the truck frame, are parallel, but after leaving the truck frame, are curved inwardly at 27 and converge until they meet at 28. The reaches meet on the center lines of the trucks and are positioned one above the other being separated by blocks 29 and terminal bars 30 and 30ª through which they are bolted or riveted. The terminal bars 30 and 30ª extend a suitable distance beyond the ends of the reaches 25. The bar 30 is provided with a plate 31 fixed thereto, said plate having an upturned catch 32 on each side of the bar. The bar 30 is supported between a suitable hanger 33 depending from the center of the car body, and a disconnecting bar 34 having a central hump 35 and upturned end stops 36, said bar 34 being slidably mounted on the hanger 33 by means of a plurality of guides 37. The terminal bar 30ª rests on the disconnecting bar 34 and is prevented from escaping therefrom by a light spring strap 38 fixed between the end stops 36. The strap 38 does not rest on the hump 35 but is at such a distance thereabove that the terminal bar in passing over the hump will bend the strap 38. The terminal bars 30 and 30ª are normally disconnected, the bar 30ª resting on the hump immediately above the space between the catches 32. When the trucks pass onto a plain curve, the reach from the leading truck moves outwardly first. On the hind truck reaching the curve, the reach tends to move outwardly beyond the reach of the leading truck and in passing the reach from the leading truck, falls between the catches 32 carried by the bar 30 thus connecting the reaches so that the swing of one truck corrects the swing of the other. When the trucks are passing over a reverse curve, the bars 30 and 30ª move in opposite directions, owing to the opposite swing of the trucks, and do not engage. Any considerable movement inwardly of the reaches relatively to the car body causes them to disconnect by means of the hump 35 lifting the terminal bar 30ª to clear the catch 32.

Having thus described my invention, what I claim is:—

1. In a device of the character described, the combination with the car trucks, of a pair of arms rigidly secured to each truck, said arms being converged to meet in superposed relation midway between the trucks, connecting bars fixed to each pair of arms, and catches carried by one of said bars and adapted to engage the other of said bars, substantially as described.

2. An attachment for alining railway car trucks comprising a pair of arms rigidly secured to the sides of each truck, said arms converging to meet in superposed relation midway between said trucks, connecting bars fixed to each pair of arms, a plate fixed to one of said bars, catches on said plate adapted to engage the other of said bars, and means for supporting said connecting bars, substantially as described.

3. An attachment for alining railway car trucks comprising a pair of arms rigidly secured to the sides of each truck, said arms converging to meet in superposed relation midway between said trucks, connecting bars fixed to each pair of arms, a plate fixed to one of said bars, catches on said plate adapted to engage the other of said bars, a hanger for supporting said bars, a disengaging bar slidably mounted on said hanger, and a hump in said disengaging bar adapted to lift the connecting bar out of engagement with said catches, whereby the trucks will be free to oscillate independently, substantially as described.

4. An attachment for alining railway trucks comprising a pair of converging arms rigidly secured to the sides of each truck, terminal bars fixed to the extremities of said arms, a plate fixed to one of said terminal bars, catches on said plate adapted to engage the second of said terminal bars, a hanger supporting the first of said terminal bars, a disengaging bar slidably mounted on said hanger above the first terminal bar, a hump in said disengaging bar adapted to lift the second terminal bar out of engagement with said catches, upturned end stops on said disengaging bar, and a flexible strap fixed between said end stops, substantially as described.

In witness whereof I have hereunto set my hand in the presence of two witnesses.

ARTHUR C. DENNIS.

Witnesses:
C. W. TAYLOR,
E. B. MCKENZIE.